United States Patent
Tomono et al.

(10) Patent No.: US 9,984,663 B2
(45) Date of Patent: May 29, 2018

(54) DISPLAY DEVICE, SCREEN DISPLAY METHOD, RECORDING MEDIUM, AND IMAGE PROCESSING APPARATUS

(71) Applicant: KONICA MINOLTA, INC., Chiyoda-ku, Tokyo (JP)

(72) Inventors: Kazuaki Tomono, Okazaki (JP); Hozuma Nakajima, Toyokawa (JP); Hiroki Tajima, Itami (JP); Kenzo Yamamoto, Toyohashi (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days. days.

(21) Appl. No.: 15/440,413

(22) Filed: Feb. 23, 2017

(65) Prior Publication Data
US 2017/0263217 A1    Sep. 14, 2017

(30) Foreign Application Priority Data

Mar. 10, 2016 (JP) ................................ 2016-047247

(51) Int. Cl.
*G06K 15/02* (2006.01)
*G09G 5/391* (2006.01)
(Continued)

(52) U.S. Cl.
CPC ............ *G09G 5/391* (2013.01); *G09G 5/005* (2013.01); *H04N 1/0049* (2013.01);
(Continued)

(58) Field of Classification Search
None
See application file for complete search history.

(56) References Cited

U.S. PATENT DOCUMENTS

| 8,514,254 B2 | 8/2013 | Choi et al. |
| 2008/0201378 A1 | 8/2008 | Nagahara et al. |
| 2010/0020104 A1 | 1/2010 | Mitsumata |

FOREIGN PATENT DOCUMENTS

| JP | 2003-256827 A | 9/2003 |
| JP | 2003-323456 A | 11/2003 |
| JP | 2015-011605 A | 1/2015 |

OTHER PUBLICATIONS

Translation_of_JP_2003_256827.pdf, Yatsukawa Hiroshi, Image Reprodution Method, Image Reproducting Device and Recording Medium With Image Reproduction Processing Program Recorded, Sep. 2003, Sharp Corp, pp. 1-9.*

(Continued)

*Primary Examiner* — Dov Popovici
(74) *Attorney, Agent, or Firm* — Buchanan Ingersoll & Rooney PC

(57) ABSTRACT

A display device includes: a display; a base screen image storage that stores a base screen image; a resolution judgment portion that judges whether or not the display resolution is equal to a reference resolution; an image creator that creates a first image by enlarging or reducing the base screen image to the display resolution while sacrificing image quality for speed and creates a second image by enlarging or reducing the same to the display resolution while sacrificing speed for image quality; a second image storage that stores the second image; a display processor that causes the display to display the first or second image upon screen switch; and a screen judgment portion that judges which screen a screen displayed on the display is, a screen deserving or not deserving for a second image to be stored, with reference to reference information.

16 Claims, 21 Drawing Sheets

(51) Int. Cl.
*H04N 1/00* (2006.01)
*G09G 5/00* (2006.01)
*H04N 1/21* (2006.01)
*H04N 21/4335* (2011.01)
*G06F 3/12* (2006.01)

(52) U.S. Cl.
CPC ..... *H04N 1/00411* (2013.01); *H04N 1/00424* (2013.01); *H04N 1/00442* (2013.01); *H04N 1/00469* (2013.01); *H04N 1/00506* (2013.01); *H04N 1/21* (2013.01); *H04N 21/4335* (2013.01); *G09G 2340/0407* (2013.01); *H04N 1/00408* (2013.01); *H04N 2201/0089* (2013.01); *H04N 2201/0094* (2013.01); *H04N 2201/218* (2013.01)

(56) References Cited

OTHER PUBLICATIONS

The extended European Search Report dated Jul. 27, 2017, by the European Patent Office in corresponding European Application No. 17159822.0. (16 pages).

* cited by examiner

| Not-to-be-cached Screen | warning screen, thumbnail view screen, preview screen |
|---|---|
| To-be-cached Screen | other screens |

FIG.3

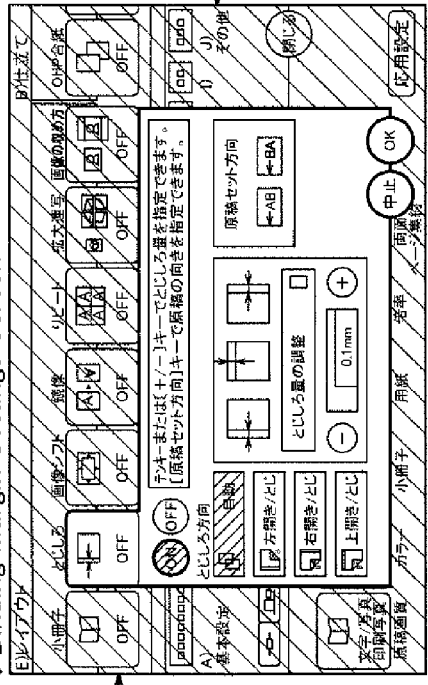
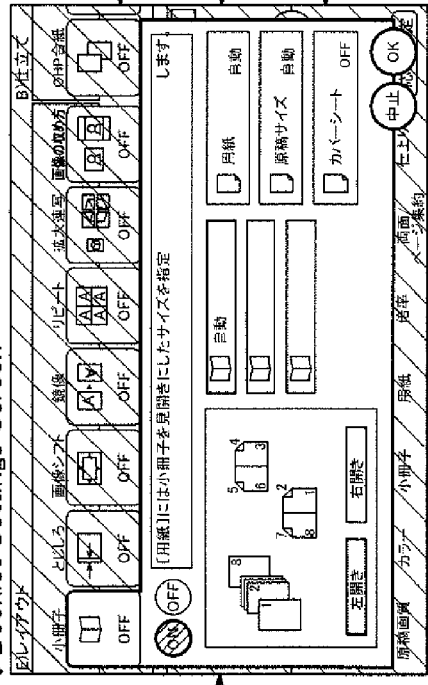
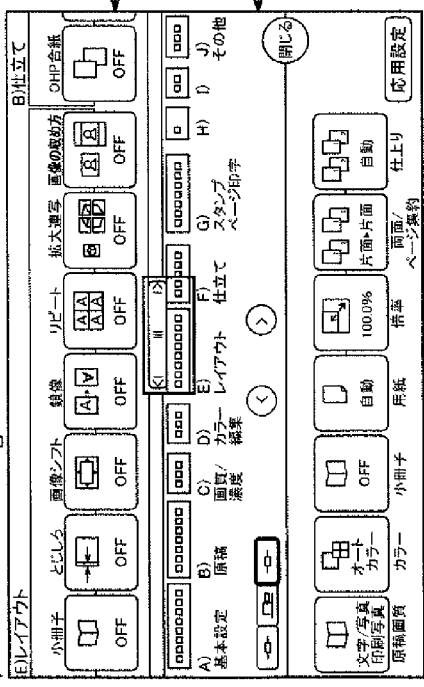
FIG.4A
FIG.4
| FIG.4A | FIG.4B |

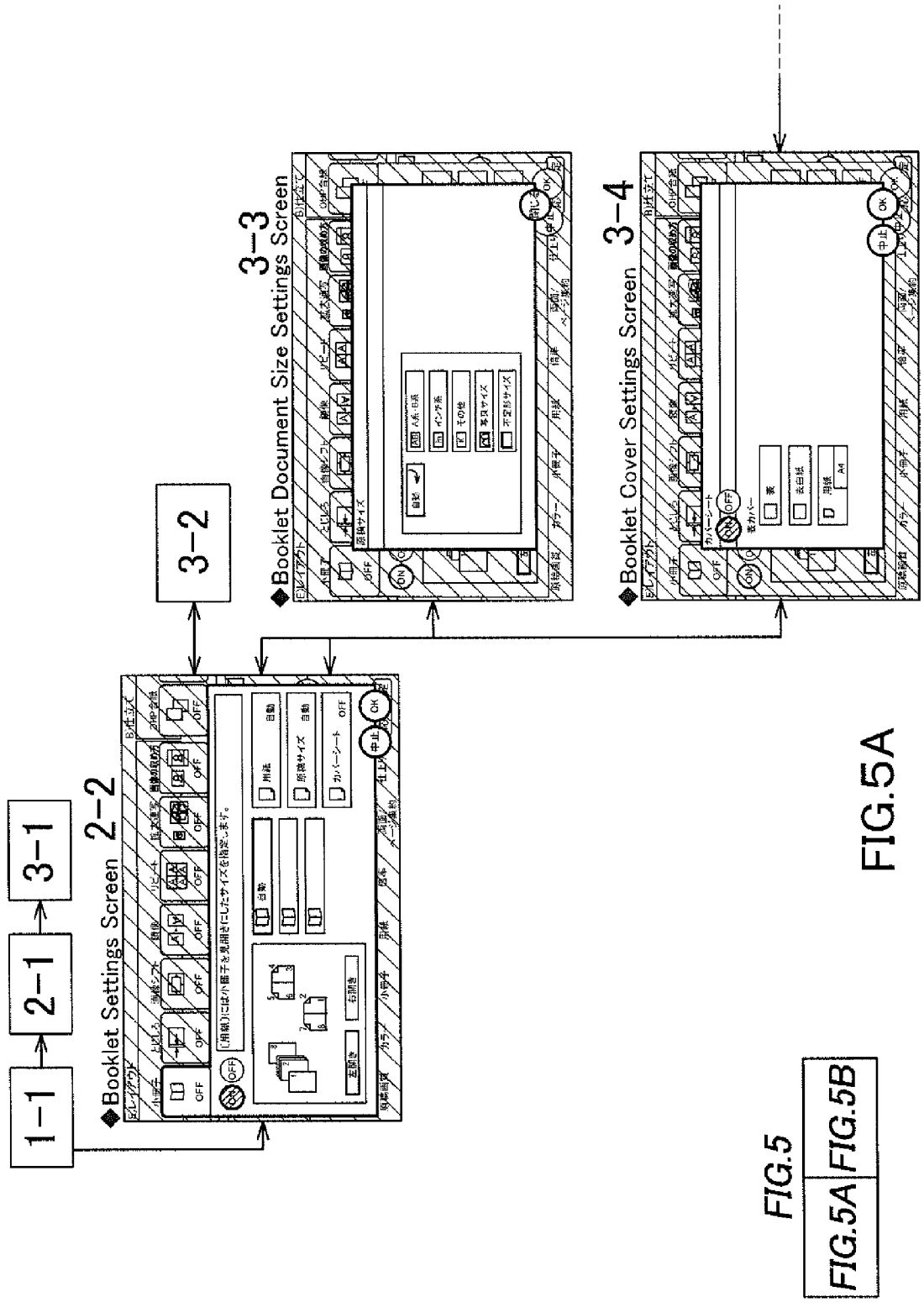

| FIG.5A | FIG.5B |

| FIG.6A | FIG.6B |
| FIG.6C | FIG.6D |

| FIG.6A | FIG.6B |
| FIG.6C | FIG.6D |

| FIG.6A | FIG.6B |
| FIG.6C | FIG.6D |

| FIG.7A | FIG.7B |
| FIG.7C | FIG.7D |

| FIG.7A | FIG.7B |
|---|---|
| FIG.7C | FIG.7D |

| FIG.7A | FIG.7B |
| FIG.7C | FIG.7D |

| FIG.7A | FIG.7B |
| FIG.7C | FIG.7D |

| FIG.8A | FIG.8B |
|---|---|
| FIG.8C | FIG.8D |

FIG.8B

● Cached Screen Information

| No | Screen | Settings Changed/Not Changed | Screen Used |
|---|---|---|---|
| 1 | Biding Margin Orientation Settings Screen | Changed | Yes |
| 2 | Binding Margin Settings Screen | Not changed | Yes |
| 3 | Advanced Settings Screen | Not changed | Yes |
| 4 | Booklet Settings Screen | Not changed | Yes |
| 5 | Booklet Document Size Settings Screen | Not changed | No |
| 6 | Booklet Cover Settings Screen | Not changed | Yes |

| *FIG.8A* | *FIG.8B* |
|---|---|
| *FIG.8C* | *FIG.8D* |

Cached Screen Information

| No | Screen | Settings Changed /Not Changed | Screen Used |
|---|---|---|---|
| 1 | Biding Margin Orientation Settings Screen | Changed | Yes |
| 2 | Binding Margin Settings Screen | Not changed | Yes |
| 3 | Advanced Settings Screen | Not changed | Yes |
| 4 | Booklet Settings Screen | Not changed | Yes |
| 5 | Booklet Cover Settings Screen | Not changed | Yes |
| 6 | Booklet Cover Paper Settings Screen | Not changed | Yes |

| FIG.8A | FIG.8B |
|---|---|
| FIG.8C | FIG.8D |

DISPLAY DEVICE, SCREEN DISPLAY METHOD, RECORDING MEDIUM, AND IMAGE PROCESSING APPARATUS

This application claims priority under 35 U.S.C. § 119 to Japanese Patent Application No. 2016-047247 filed on Mar. 10, 2016, the entire disclosure of which is incorporated herein by reference in its entirety.

BACKGROUND OF THE INVENTION

Field of the Invention

The present invention relates to a display device to be used, for example, in an operation panel of a multifunctional digital image forming apparatus (i.e., a multi-function peripheral abbreviated as MFP) having multiple functions such as copier function, printer function, facsimile function, and scanner function, a screen display method for the display device, a recording medium, and an image processing apparatus.

Description of the Related Art

The following description sets forth the inventor's knowledge of related art and problems therein and should not be construed as an admission of knowledge in the prior art.

The MFPs have displays of different sizes (with different display resolutions) on their operation panels, have different functions, and make prints at different speeds depending on the model. Workplaces of a large business company are ordinarily equipped with image processing apparatuses of various models depending on the number of workers and the purpose of use.

With different user interfaces depending on the model in such an environment, users would be bothered so much by learning the use of them.

As a common method to solve such a problem with the image processing apparatuses having displays with different display resolutions, identical firmwares are used in the image processing apparatuses. These firmwares store base screen images whose sizes are adjusted to one reference resolution so that the base screen images can be enlarged or reduced to the display resolutions of the displays.

This method, however, needs some extra time for a base screen image to be enlarged or reduced to the display resolution of the display if the display resolution is not equal to the reference resolution; a screen thus appears on the display slowly. As is obvious, slow screen display impairs usability. A base screen image can be enlarged or reduced quickly to avoid slow screen display but only to sacrifice image quality and usability.

As a solution to these problems, Japanese Unexamined Patent Application Publication No. 2003-256827 teaches a technique that achieves quick screen display without sacrificing image quality. In this technique, when an application is launched for the first time, a low-quality screen image is created and displayed by quick enlargement or reduction, and a high-quality screen image is then created and stored on a cache memory. When the application is launched for the subsequent times, the high-quality screen image stored on the cache memory is displayed on the display means.

This technique, however, still leaves the following problem unsolved when it is applied to an image processing apparatus configured to switch between many settings screens on its display. That means it is a costly alternative because this image processing apparatus needs to have a cache memory that is large enough for many images.

As a solution to this problem, Japanese Unexamined Patent Application Publication No. 2015-011605 teaches a technique that achieves saving on memory space on a cache memory by erasing an image from the cache memory. Specifically, when the cache memory does not have free space enough for another image, such space is ensured by erasing an image that requires the user take many operation steps to reach the target screen or erasing an image that requires the user to take a certain number of operation steps or more to reach the target screen, from the cache memory. Another image can be thus stored on the cache memory.

According to Japanese Unexamined Patent Application Publication No. 2015-011605, an image to be erased from the cache memory is determined with reference to the number of operation steps to be taken. This technique, however, still leaves the following problem unsolved.

That is, the image processing apparatus needs to switch between many settings screens to advance a job. For example, users ordinarily check for an error in address settings and correct if any in order to prevent leaks of classified information, and also check for an error in printer settings and correct if any in order to avoid waste of paper. In the technique taught in Japanese Unexamined Patent Application Publication No. 2015-011605, images that require the user take more operation steps, even if they are more likely to be used later, are automatically erased. Such images will therefore need to be recreated at a high resolution.

Furthermore, there are screen images that do not deserve to be stored on the cache memory for later use. For example, a warning screen, which is independent of tree structure, can be displayed after any screen but is rarely displayed. It is therefore irrational to store an image of this screen on the cache memory. The image processing apparatus is configured to further display a preview screen that allows a print review of a scanned document and a thumbnail view screen that allows an at-a-glance view of scanned images stored. These screens hardly can reflect images with a high degree of accuracy because of the limited display screen, and such images do not need to have a high image quality. It is therefore irrational to store them on the cache memory as well.

In contrast, in the techniques taught in Japanese Unexamined Patent Application Publications No. 2003-256827 and 2015-011605, high-quality screen images are created and stored on the cache memory even if they are screen images not deserving to be stored on the cache memory, resulting in waste of cache space.

SUMMARY OF THE INVENTION

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

A first aspect of the present invention relates to a display device including:
- a display means that displays a screen;
- a base screen image storage means that stores a base screen image of a size, the size being adjusted to a reference resolution;
- a resolution judgment means that judges whether or not the display resolution of the display means is equal to the reference resolution;
- an image creation means that creates a first image by enlarging or reducing the base screen image to the display resolution of the display means while sacrificing image quality for speed and that creates a second image with a higher image quality than that of the first image by enlarging or reducing the base screen image to the display resolution of the display means while sacrificing speed for image quality, the base screen image being stored on the base screen image storage means, if the resolution judgment means judges that the display resolution of the display means is not equal to the reference resolution;

a second image storage means that stores the second image created by the image creation means;

a display processing means that causes the display means to display the first or second image as follows if the resolution judgment means judges that the display resolution of the display means is not equal to the reference resolution: display the first image before the image creation means creates the second image, the first image being created by the image creation means; display the second image as a replacement of the first image after the image creation means creates the second image; and display the second image, if any, upon screen switch, the second image being stored on the second image storage means; and a screen judgment means that judges which screen the screen displayed on the display means is, a screen deserving or not deserving a second image to be stored on the second image storage means, with reference to reference information for judgment determining screens deserving and not deserving for second images to be stored on the second image storage means, wherein, only if the screen judgment means judges that it is a screen deserving for a second image to be stored, the image creation means creates the second image and the second image storage means stores it.

A second aspect of the present invention relates to a screen display method for a display device including:

a display means that displays a screen; and a base screen image storage means that stores a base screen image of a size, the size being adjusted to a reference resolution, the screen display method including:

judging whether or not the display resolution of the display means is equal to the reference resolution;

creating a first image by enlarging or reducing the base screen image to the display resolution of the display means while sacrificing image quality for speed and creating a second image with a higher image quality than that of the first image by enlarging or reducing the base screen image to the display resolution of the display means while sacrificing speed for image quality, the base screen image being stored on the base screen image storage means, if it is judged that the display resolution of the display means is not equal to the reference resolution;

storing the created second image on the second image storage means;

causing the display means to display the first or second image as follows if it is judged that the display resolution of the display means is not equal to the reference resolution: display the created first image before the second image is created; display the second image as a replacement of the first image after the second image is created; and display the second image, if any, upon screen switch, the second image being stored on the second image storage means; and judging which screen the screen displayed on the display means is, a screen deserving or not deserving for a second image to be stored on the second image storage means, with reference to reference information for judgment determining screens deserving and not deserving second images be stored on the second image storage means, wherein, only if it is judged that it is a screen deserving for a second image to be stored, the second image is created and stored on the second image storage means.

A third aspect of the present invention relates to a non-transitory computer-readable recording medium storing a screen display program to be run by a computer of a display device, the display device including:

a display means that displays a screen; and a base screen image storage means that stores a base screen image of a size, the size being adjusted to a reference resolution, the screen display program including:

judging whether or not the display resolution of the display means is equal to the reference resolution;

creating a first image by enlarging or reducing the base screen image to the display resolution of the display means while sacrificing image quality for speed and creating a second image with a higher image quality than that of the first image by enlarging or reducing the base screen image to the display resolution of the display means while sacrificing speed for image quality, the base screen image being stored on the base screen image storage means, if it is judged that the display resolution of the display means is not equal to the reference resolution;

storing the created second image on the second image storage means;

causing the display means to display the first or second image as follows if it is judged that the display resolution of the display means is not equal to the reference resolution: display the created first image before the second image is created; display the second image as a replacement of the first image after the second image is created; and display the second image, if any, upon screen switch, the second image being stored on the second image storage means; and judging which screen the screen displayed on the display means is, a screen deserving and not deserving for a second image to be stored on the second image storage means, with reference to reference information for judgment determining screens deserving and not deserving for second images to be stored on the second image storage means, wherein, only if it is judged that it is a screen deserving for a second image to be stored, the second image is created and stored on the second image storage means.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying drawings, in which:

FIG. 3 indicates an example of a table that determines screens deserving for second images to be created and stored and screens not deserving for second images to be created and stored;

FIGS. 4A, and 4B illustrates a tree screen structure that contains "binding margin settings" screens and "booklet settings" screens as advanced copier settings screens;

FIGS. 5A, and 5B illustrates another tree screen structure that contains "binding margin settings" screens and "booklet settings" screens as advanced copier settings screens;

FIGS. 8A, 8B, 8C, and 8D constitute yet another explanatory view on how to switch between advanced copier settings screens;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, some embodiments of the present invention will be described with reference to the accompanying drawings.

Figure 1:
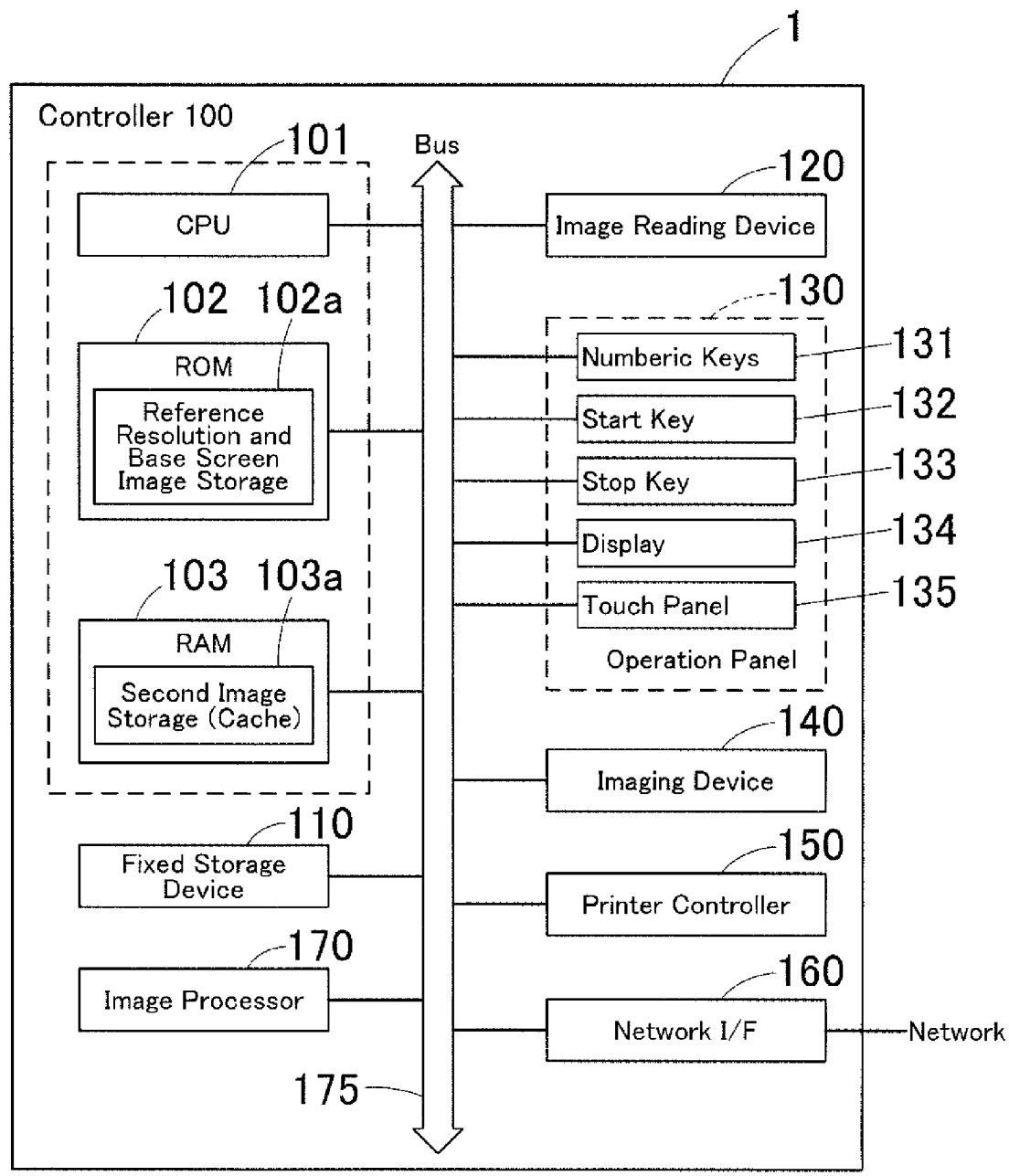
FIG. 1 is a block diagram illustrating an electrical configuration of an image processing apparatus that is provided with a display device according to one embodiment of the present invention.

FIG. 1 is a block diagram illustrating an electrical configuration of an image processing apparatus that is provided with a display device according to one embodiment of the present invention. The display device may not be necessarily used in an image processing apparatus but may be used in another apparatus. In this embodiment, an MFP i.e. a multifunctional digital image forming apparatus as described above is used as an image processing apparatus. Hereinafter, an image processing apparatuses will also be referred to as "MFP".

As illustrated in FIG. 1, the MFP 1 is provided with a controller 100, a fixed storage device 110, an image reading device 120, an operation panel 130, an imaging device 140, a printer controller 150, a network interface (network I/F) 160, and an image processor 170, all of which are connected to each other through a system bus 175.

The controller 100 is provided with a CPU 101, a ROM 102, and a RAM 103.

The CPU 101 controls the MFP 1 in a unified and systematic manner by executing programs stored on a recording medium such as the ROM 102. For example, the CPU 101 controls the MFP 1 to enable its functions such as copier function, printer function, scanner function, and facsimile function. In this embodiment, the CPU 101 further controls the display of graphic operation screens on a display 134 of the operation panel 130, which will be described in details later on.

The ROM 102 stores programs to be run by the CPU 101. The ROM 102 is provided with a reference resolution and base screen image storage 102a, which stores a reference resolution and various base screen images whose sizes are adjusted to the reference resolution. Each screen is composed of one or more screen elements. Each screen element is already adjusted to an appropriate size for the reference resolution, and each base screen image is thus composed of screen elements of their appropriate sizes.

The RAM 103 serves as a work area for the CPU 101 to load programs and temporarily stores programs, data for executing the programs, and other data. The RAM 103 is provided with a second image storage (hereinafter also referred to as "cache") 103a that is a cache memory. The cache 103a stores a high-quality screen image that is a base screen image enlarged or reduced to the actual display resolution of the display 134.

The fixed storage device 110 consists of a hard disk drive, for example, and stores programs and other data of various types.

The image reading device 120 is essentially provided with a scanner. The image reading device 120 obtains an image by scanning a document put on a platen and converts the obtained image into image data format.

Figure 2:
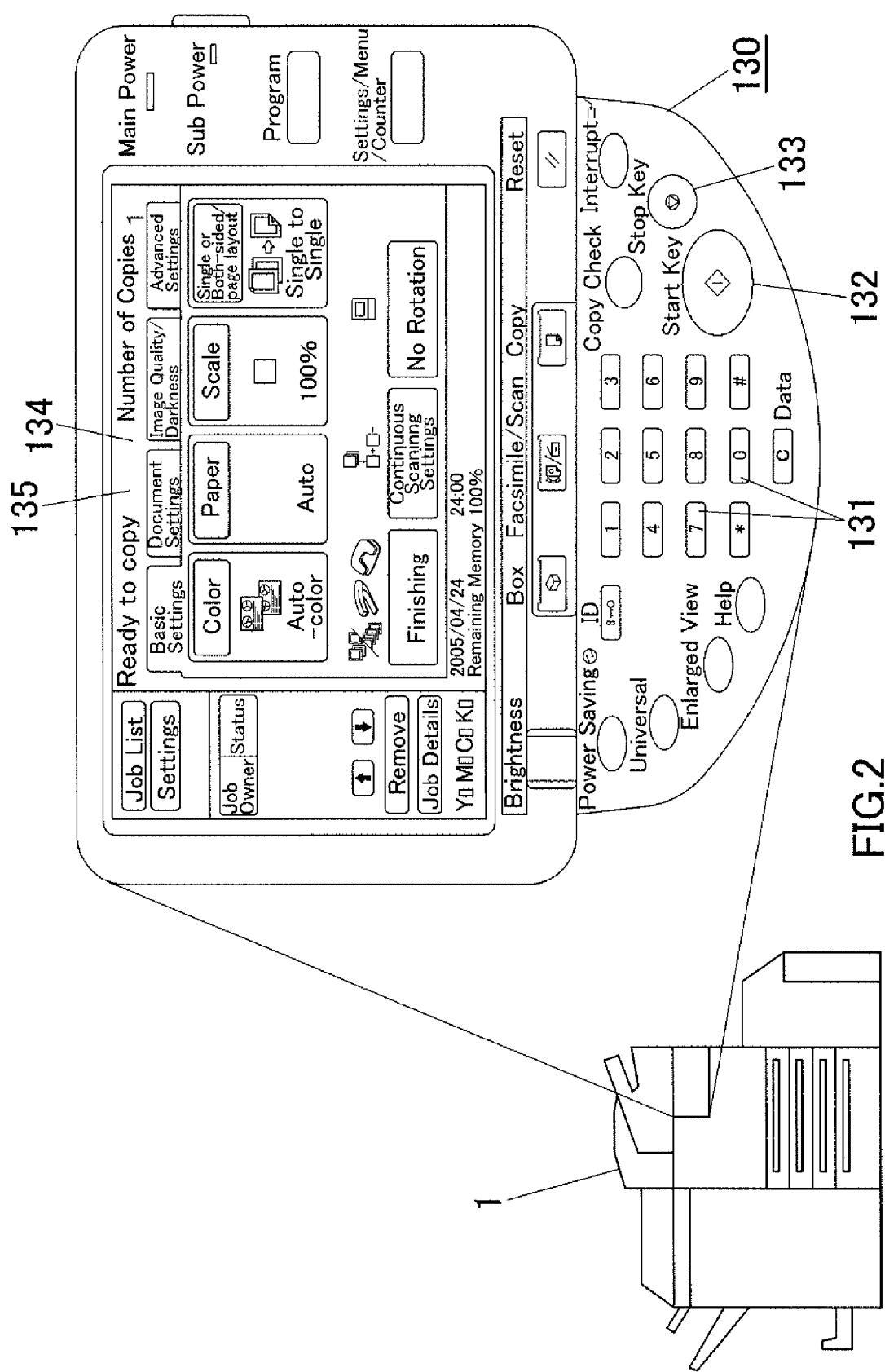
FIG. 2 illustrates an enlarged view of an operation screen of the image processing apparatus.

The operation panel 130 allows the user to give instructions such as jobs to the MFP 1 and to configure various settings of the MFP 1. As referred to the enlarged view of FIG. 2, the operation panel 130 is essentially provided with various hardware keys such as numeric keys 131, a start key 132, and a stop key 133, a display 134, and a touch panel 135.

The numeric keys 131 allow the user to configure various settings. The start key 132 allows the user to start operation, for example, start scanning. The stop key 133 allows the user to stop operation when pressed.

The operation panel 134 consists of a liquid-crystal screen, for example, which displays messages, various operation screens, and other information. The resolution (screen size) of the display 134 varies depending on the model of the MFP 1, for example.

The touch panel 135 is disposed on the screen of the display 134 and detects a touch operation by a user.

The imaging device 140 prints on paper copy images based on image data obtained from a document by the image reading device 120 and print data.

The printer controller 150 forms copy images based on print data received by the network interface 160.

The network interface (network I/F) 160 serves as a communication means that exchange data with external apparatuses such as terminal apparatuses.

The image processor 170 enlarges or reduces base screen images to the resolution of the display 134 when the display resolution of the display 134 is not equal to a reference resolution.

The MFP 1 of FIG. 1 performs operations related to the display of graphic screens on the display 134 of the operation panel 130, which will be described in details below.

Each screen to be displayed on the display 134 is composed of a set of screen elements of multiple types. As described above, multiple types of screen element and the number of each type, as one base screen image, are stored on the reference value and base screen image storage 102a of the ROM 102. Screen elements are button images, icon images, background images, thumbnail images, preview images, or a combination of images of some of the foregoing types.

Upon start-up of the MFP 1, the CPU 101 obtains a reference resolution from the reference resolution and base screen image storage 102*a* of the ROM 102 and obtains the display resolution of the display 134 from the operation panel 130. The CPU 101 then judges whether or not the display resolution of the display 134 is equal to the reference resolution by comparing them. If it is equal to the reference resolution, the CPU 101 displays a base screen image of an initial screen, which is stored on the reference resolution and base screen image storage 102*a*, on the display 134. If it is not equal to the reference resolution, the CPU 101 enlarges or reduces the base screen image, which is stored on the reference resolution and base screen image storage 102*a*, to the display resolution of the display 134 by the image processor 170. The CPU 101 then displays the screen image, which is already created by enlargement or reduction, on the display 134. The CPU 101 can enlarge or reduce the base screen image while sacrificing image quality for speed and thus achieve quick screen display. That is, the CPU 101 creates a low-quality screen image (to be referred to as "first image") quickly.

The CPU 101 can also enlarge or reduce the base screen image to the display resolution of the display 134 by the image processing 170 while sacrificing speed for image quality. That is, the CPU 101 creates a high-quality screen image (to be referred to as "second image") less quickly than it creates a first image.

After creating the second image, the CPU 101 displays the second image, having a high image quality, on the display 134 as a replacement of the first image, having a low image quality, and then stores the second image on the cache 103*a* of the RAM 103.

When the user performs operation switch on the display 134, the CPU 101 creates a first image of a subsequent screen in a size adjusted to the display resolution of the display 134, displays it on the display 134, creates a second image of the subsequent screen, having a high image quality, and then displays it as a replacement of the first image. The CPU 101 then stores the second image on the cache 103*a* of the RAM 103.

Upon every screen switch, the CPU 101 creates a first image of a target screen, displays it, creates a second image of the target screen, displays it as a replacement of the first image, and stores the second image on the cache 103*a*.

The second image of the target screen may be already created and stored on the second image storage 103*a*. In this case, the CPU 101 does not create a first image, but displays the second image, which is stored on the cache 103*a* and has a high image quality, on the display 134, then stores it on the second image storage 103*a*. In this case, a high-quality screen image is quickly displayed upon user operation.

Second images of all target screens may be already created and stored on the cache 103*a*; in this case, however, the cache 103*a* will run out of free space.

As a solution to this problem, in this embodiment, a reference table that determines screens deserving and not deserving for second images to be created and stored is stored on a recording medium such as the ROM 102. With reference to this reference table, the CPU 101 judges which screen the target screen is, a screen deserving or not deserving for a second image to be created and stored. If it is a screen deserving for a second image to be created and stored, the CPU 101 creates a second image and stores it on the cache 103*a*; if it is a screen not deserving for a second image to be created and stored, the CPU 101 does not create a second image or stores it on the cache 103*a*.

FIG. 3 is an example of the reference table. As indicated in the example of FIG. 3, a warning screen, a thumbnail view screen, and a preview screen are defined in advance as not-to-be-cached screens not deserving for second images to be created or stored, and the other screens such as function top screens including a copier top screen and a scanner top screen, value settings screens, and an active job screen are defined in advance as to-be-cached screens deserving for second images to be created and stored. A warning screen is a screen that notifies the user of an operation error, for example, with a warning message. A thumbnail view screen is a screen including thumbnail images, and a preview screen is a screen including a preview image.

A warning screen can be displayed after any screen but is rarely displayed; it is thus irrational to create and store a second image of this screen for later use. A preview screen allows a print review of a scanned document, and a thumbnail view screen allows an at-a-glance view of all scanned images stored. The preview screen and the thumbnail view screen can hardly preview with great precision and can even waste the advantage of high-quality images because of the limited display resolution; it is thus irrational to store second images of these screens for later use.

In this embodiment, the foregoing screens are defined in advance as screens not deserving for second images to be created or stored, which can prevent the cache 103*a* from lacking in enough free space. Enough free memory space can avoid the inconvenience of automatically erasing a second image to be used later.

The MFP 1 switches the display screen on the display 134 in accordance with a user operation, which will be described in details with some examples of advanced copier settings screens.

FIGS. 4A, 4B, 5A, and 5B each illustrate a tree screen structure that contains "binding margin settings" screens and "booklet settings" screens as advanced copier settings screens.

Figure 4B:
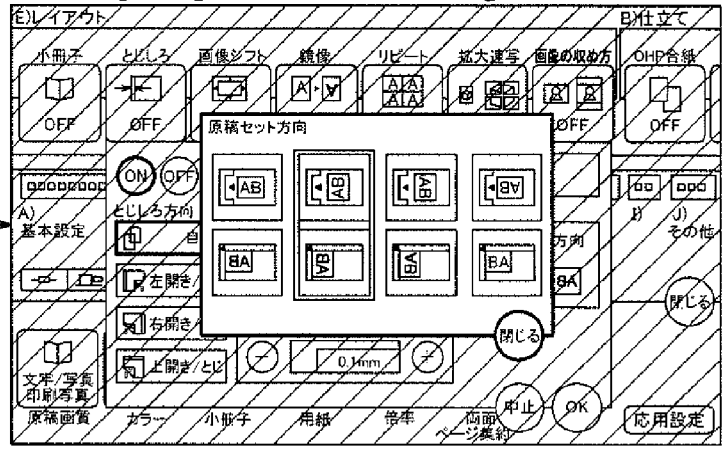
Figure 4B:
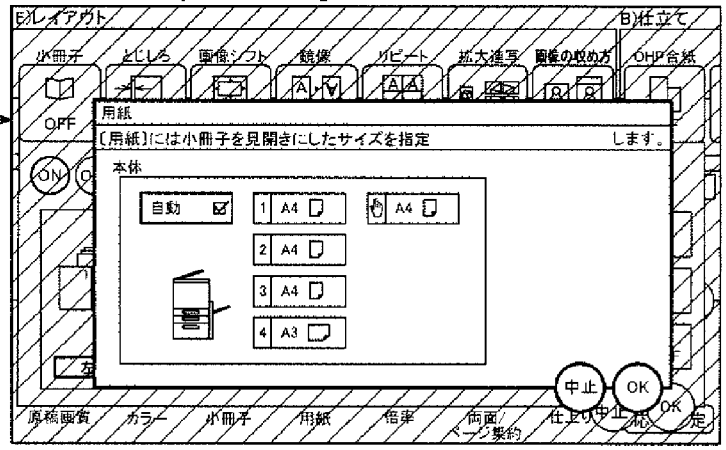

To change the document orientation in binding margin settings, the user leaves an advanced settings screen 1-1 illustrated in FIG. 4A and goes to a binding margin settings screen 2-1 illustrated in FIG. 4A, then to a binding margin orientation settings screen 3-1 illustrated in FIG. 4B. The user can change the document orientation on the binding margin orientation settings screen 3-1.

To change the paper in booklet settings, the user leaves the advanced settings screen 1-1 illustrated in FIG. 4A and goes to a booklet settings screen 2-2 illustrated in FIG. 4A, then to a booklet paper settings screen 3-2 illustrated in FIG. 4B. The user can change the paper on the booklet paper settings screen 3-2.

To change the document size in booklet settings, the user leaves the advanced settings screen 1-1 illustrated in FIG. 4A and goes to a booklet settings screen 2-2 illustrated in FIG. 5A, then to a booklet size settings screen 3-3 illustrated in FIG. 5A. The user can change the document size on the booklet size settings screen 3-3.

Figures 5, 5B:
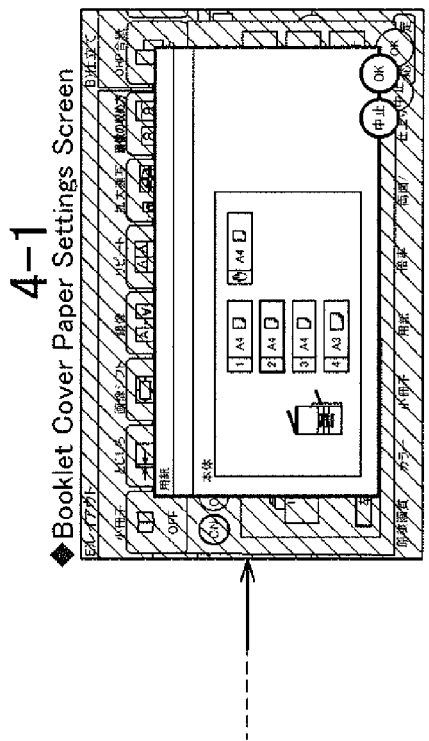

To change the cover paper in booklet settings, the user leaves the advanced settings screen 1-1 illustrated in FIG. 4A and goes to the booklet settings screen 2-2 illustrated in FIG. 5A, and to a booklet cover settings screen 3-4 illustrated in FIG. 5A, and then to a booklet cover paper settings screen 4-1 illustrated in FIG. 5B. The user can change the cover paper on the booklet cover paper settings screen 4-1.

In this embodiment, upon every screen switch, an image of a screen is stored on the cache 103*a*. Meanwhile, the following information (also to be referred to as "cached screen information") is added as a new record in connection with the screen: "target screen", "whether settings were changed on the screen", and "whether or not the screen is a screen used to reach the screen currently displayed or whether or not the screen is a screen used to reach the screen on which settings were changed".

As for "a screen used to reach the screen currently displayed", when the booklet size settings screen 3-3 is currently displayed, for example, the advanced settings screen 1-1 and the booklet settings screen 2-2 are screens used to reach the booklet size settings screen 3-3. As for "a screen used to reach the screen on which settings were changed", when the user changes a default value on the booklet cover paper settings screen 4-1, for example, the advanced settings screen 1-1, the booklet settings screen 2-2, and the booklet cover settings screen 3-4 are screens used to reach the booklet cover paper settings screen 4-1.

Hereinafter, screen switch will be further described in details. To change the default orientation in binding margin settings, the user leaves the advanced settings screen 1-1 illustrated in FIG. 4A and goes to the binding margin settings screen 2-1 illustrated in FIG. 4A, then to the binding margin orientation settings screen 3-1 illustrated in FIG. 4B. When the user reaches an advanced settings screen 1-1 illustrated in FIG. 6A, a first image of the advanced settings screen 1-1, having a low image quality, is created and displayed, and a second image of the advanced settings screen 1-1, having a high image quality, is created and displayed as a replacement of the first image. The second image is then stored on the cache 103a.

Figures 6, 6A:
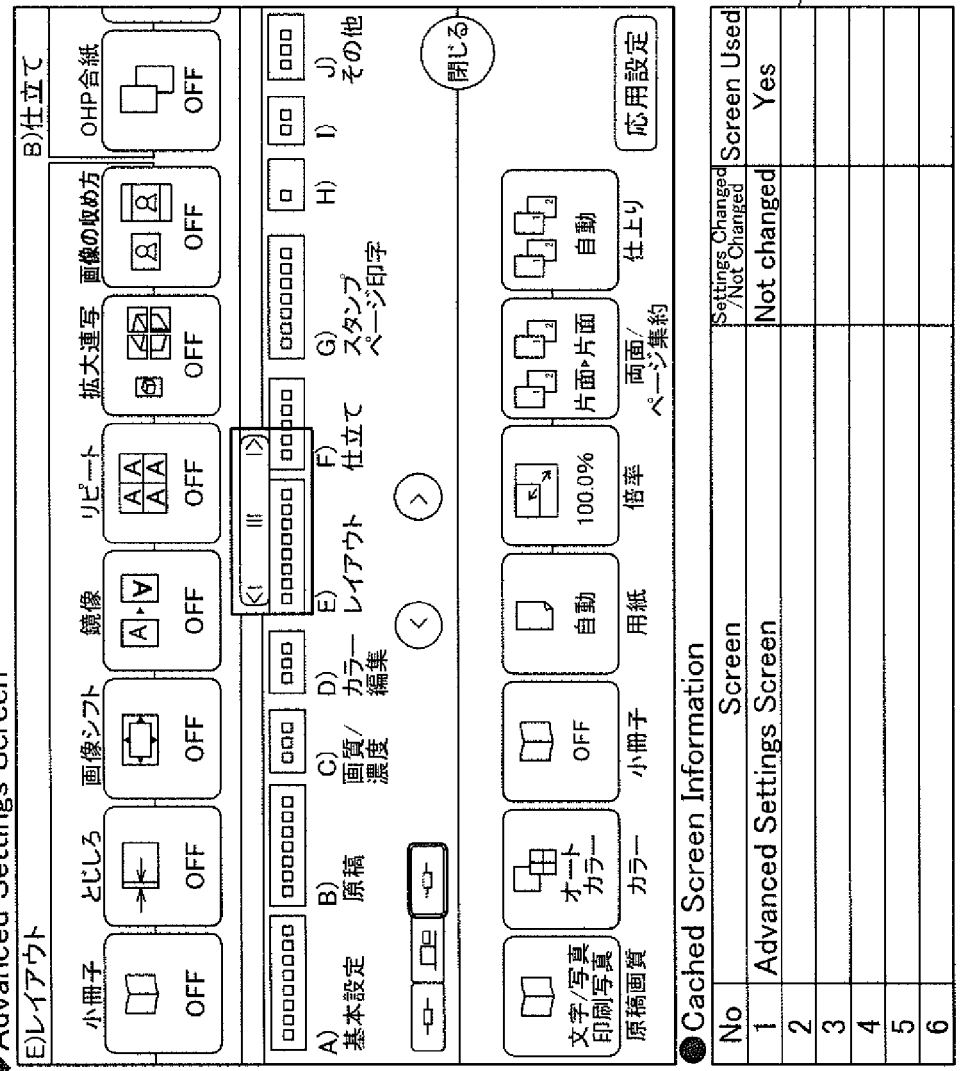
FIGS. 6A, 6B, 6C, and 6D constitute an explanatory view on how to switch between advanced copier settings screens.

Meanwhile, a new record is added as the cached screen record No. 1 as indicated in a cached screen information table 21 in FIG. 6A; this record describes "Advanced Settings Screen" in the "Screen" column, which means the target screen, and "Not Changed" in the "Settings Changed/Not Changed" column, which means that settings were not changed on the screen. This record further describes "Yes" in the "Screen Used" column, which means that the screen is a screen used to reach the screen currently displayed or that the screen is a screen used to reach the screen on which settings were changed. The description in the "Screen Used" column can be changed depending on a screen to be displayed later.

Figure 6B:
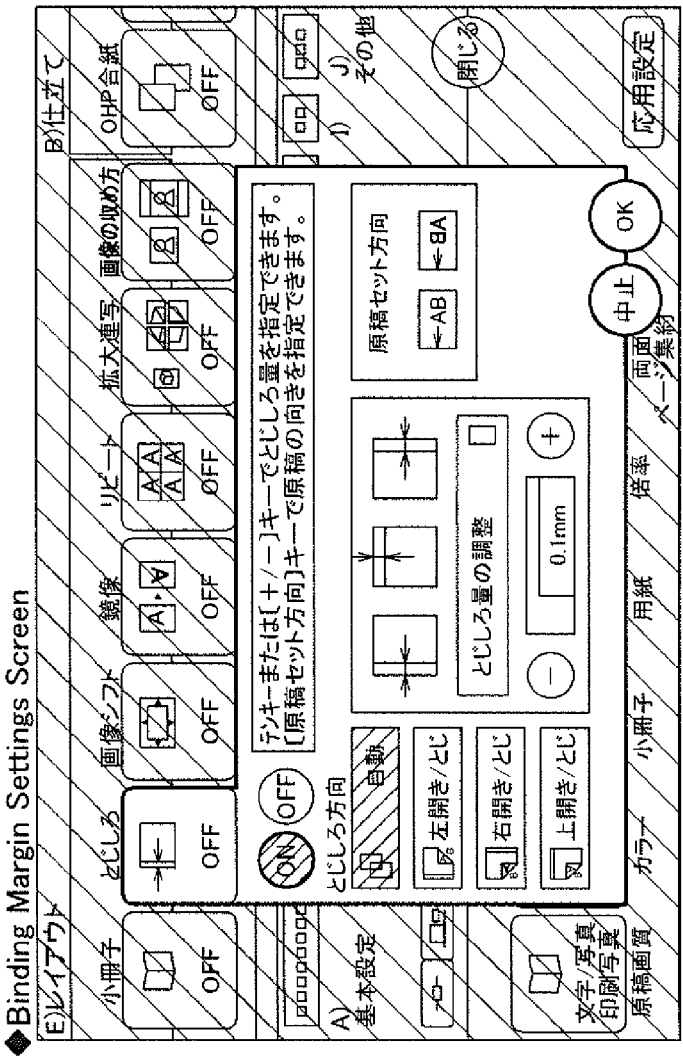

After that, when the user goes to a binding margin settings screen 2-1 illustrated in FIG. 6B, a second image of the binding margin settings screen 2-1, having a high image quality, is created and displayed as a replacement of a low-quality screen image. The MFP 1 then stores the second image on the cache 103a.

Meanwhile, a new record is added as the cached screen record No. 2 as indicated in a cached screen information table 22 in FIG. 6B; this record describes"Binding Margin Settings Screen" in the "Screen" column, "Not Changed" in the "Settings Changed/Not Changed" column, and "Yes" in the "Screen Used" column. The cached screen record No. 1 still describes "Yes" in the "Screen Used" column because it relates to an "Advanced Settings Screen" that is used to reach the "Binding Margin Settings Screen" that is currently displayed.

Figures 6, 6C:
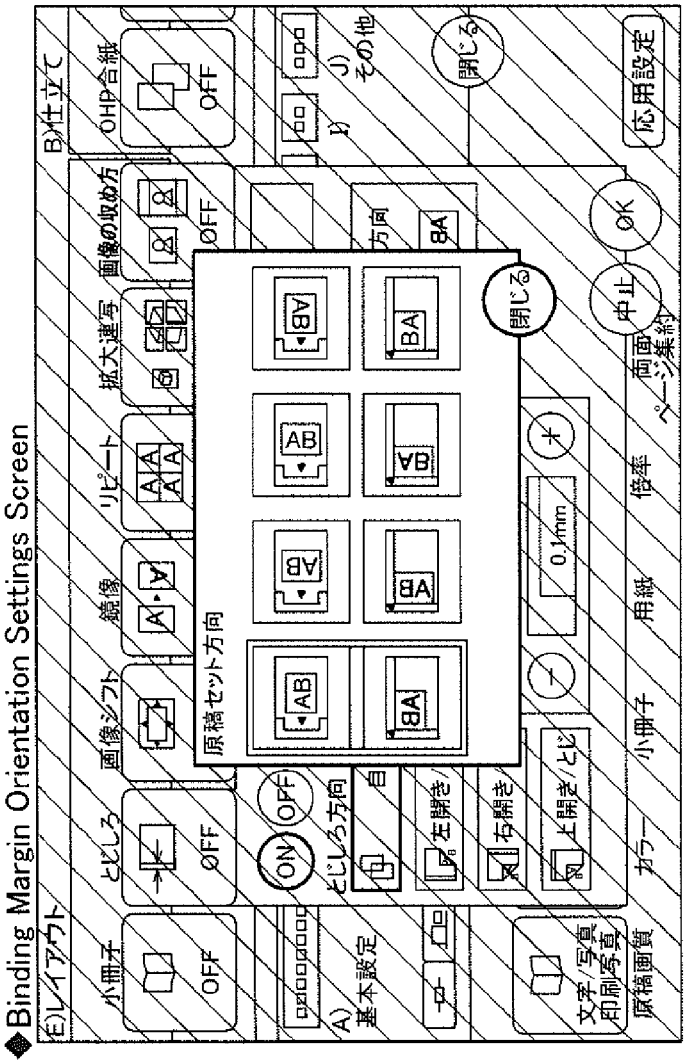

After that, when the user goes to a binding margin orientation settings screen 3-1 illustrated in FIG. 6C, a second image of the binding margin orientation settings screen 3-1, having a high image quality, is created and displayed as a replacement of a low-quality screen image. The second image is then stored on the cache 103a.

Meanwhile, a new record is added as the cached screen record No. 3 as indicated in a cached screen information table 23 in FIG. 6C; this record describes "Binding Margin Orientation Settings Screen" in the "Screen" column, "Not Changed" in the "Settings Changed/Not Changed" column, and "Yes" in the "Screen Used" column. The cached screen record No. 2 still describes "Yes" in the "Screen Used" column because it relates to a "Binding Margin Settings Screen" that is used to reach the binding margin orientation settings screen that is currently displayed.

Figures 6, 6D:
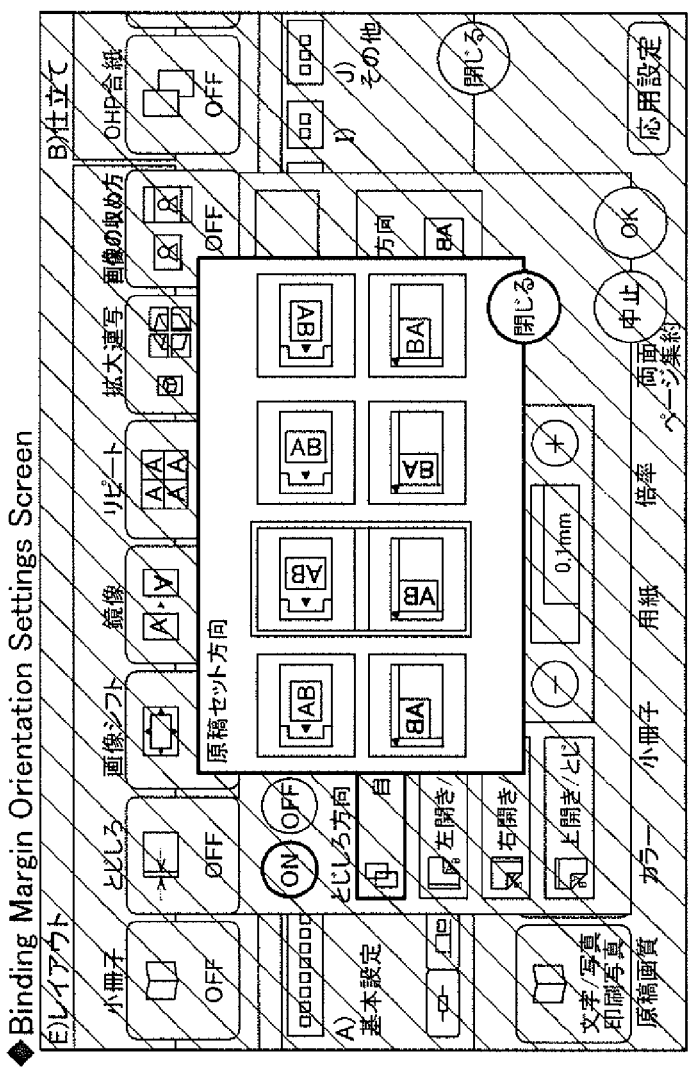

After that, when the user changes a default value on a binding margin orientation settings screen 3-1 illustrated in FIG. 6D, the cached screen record No. 3 is updated as indicated in a cached screen information table 24 in this figure; this record relates to a "Binding Margin Orientation Settings Screen", and the description in the "Settings Changed/Not Changed" column is changed from "Not Changed" to "Changed".

After that, when the user leaves the binding margin orientation settings screen 3-1 and returns to the binding margin settings screen 2-1, then to an advanced settings screen 1-1 illustrated in FIG. 7A, 7B, 7C, 7D for booklet settings, the second images of the binding margin settings screen 2-1 and the advanced settings screen 1-1, which are already cached, are displayed; there is no need for creating other second images of these screens. Meanwhile, the cached screen records No. 1 to 3 are reordered as the binding margin orientation settings screen, the binding margin settings screen, and the advanced settings screen, in this order, as indicated in a cached screen information table 25. Alternatively, the cached screen records Nos. 1 to 3 may not be reordered.

Figures 7, 7A:
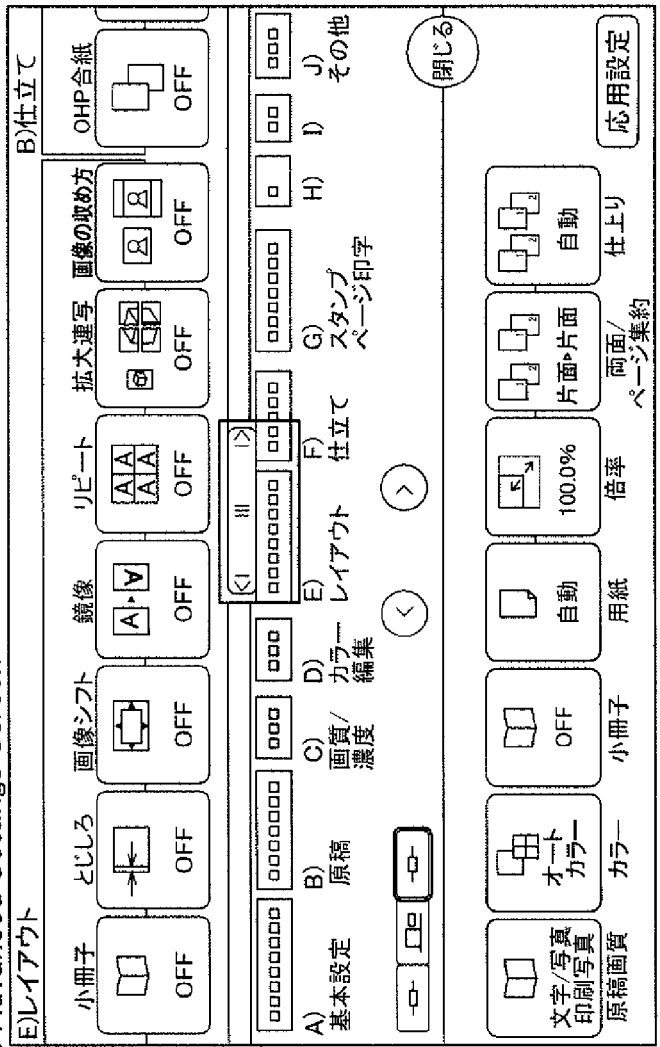
FIGS. 7A, 7B, 7C, and 7D constitute another explanatory view on how to switch between advanced copier settings screens.
Figures 7, 7B:
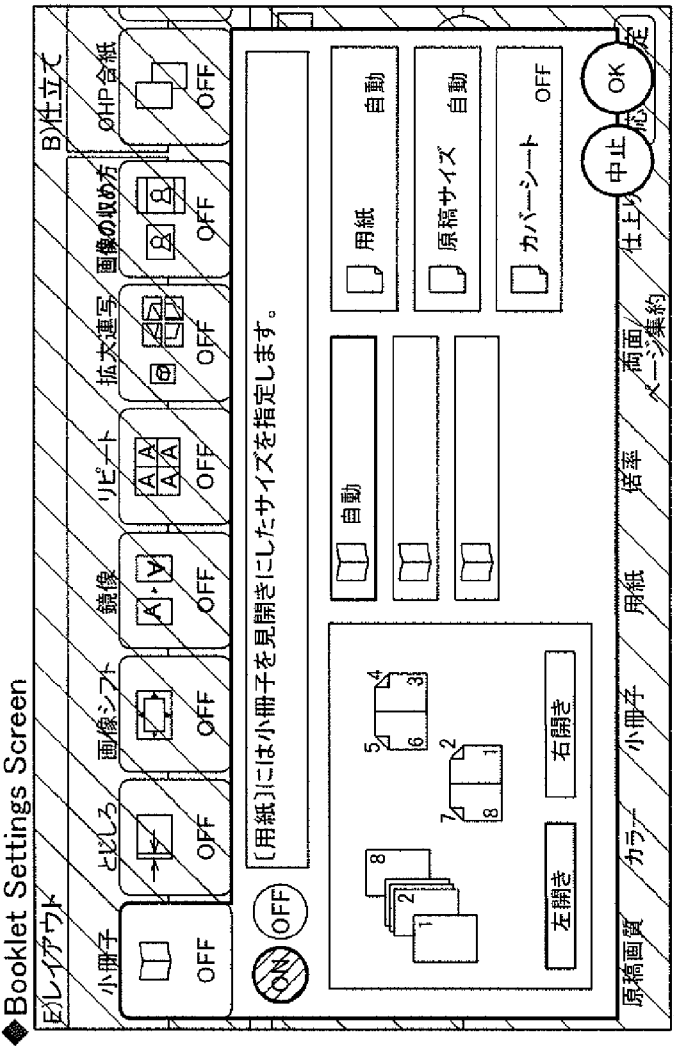

After that, when the user goes to a booklet settings screen 2-2 illustrated in FIG. 7B, a second image of the booklet settings screen 2-2, having a high image quality, is created and displayed as a replacement of a low-quality screen image. The second image is then stored on the cache 103a.

Meanwhile, a new record is added as the cached screen record No. 4 as indicated in a cached screen information table 26 in FIG. 7B; this record describes "Booklet Settings Screen" in the "Screen" column, "Not Changed" in the "Settings Changed/Not Changed" column, and "Yes" in the "Screen Used" column.

Figures 7, 7C:
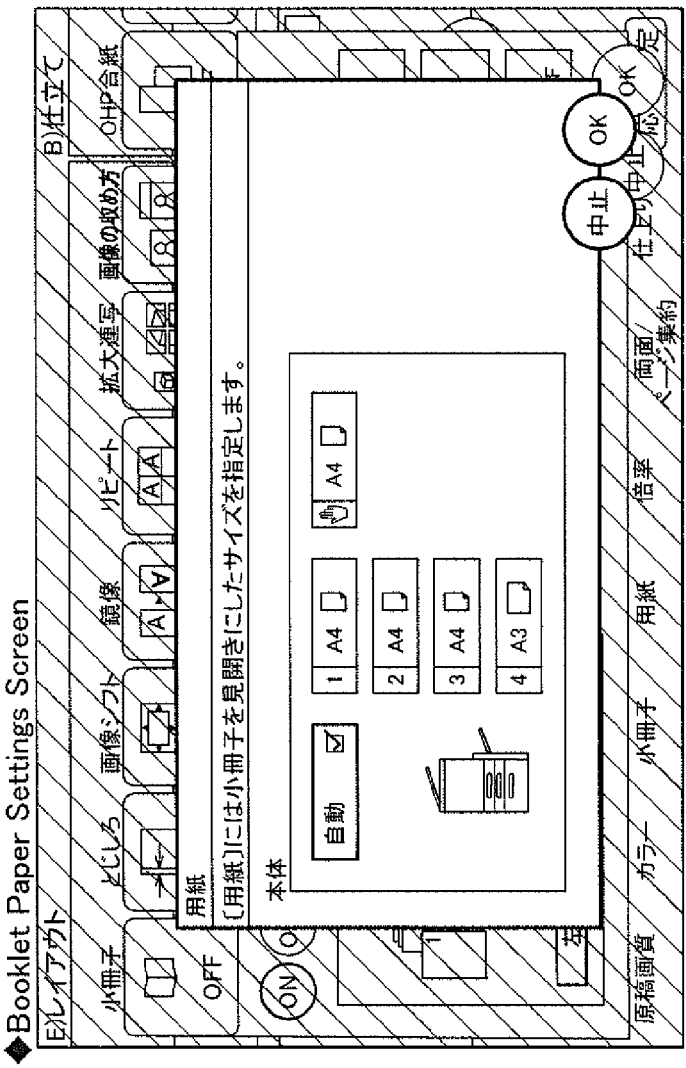

After that, when the user goes to a booklet paper settings screen 3-2 illustrated in FIG. 7C, a second image of the booklet paper settings screen 3-2, having a high image quality is created and displayed as a replacement of a low-quality screen image. The second image is then stored on the cache 103a.

Meanwhile, a new record is added as the cached screen record No. 5 as indicated in a cached screen information table 27 in FIG. 7C; this record describes "Booklet Paper Settings Screen" in the "Screen" column, "Not Changed" in the "Settings Changed/Not Changed" column, and "Yes" in the "Screen Used" column.

Figures 7, 7D:
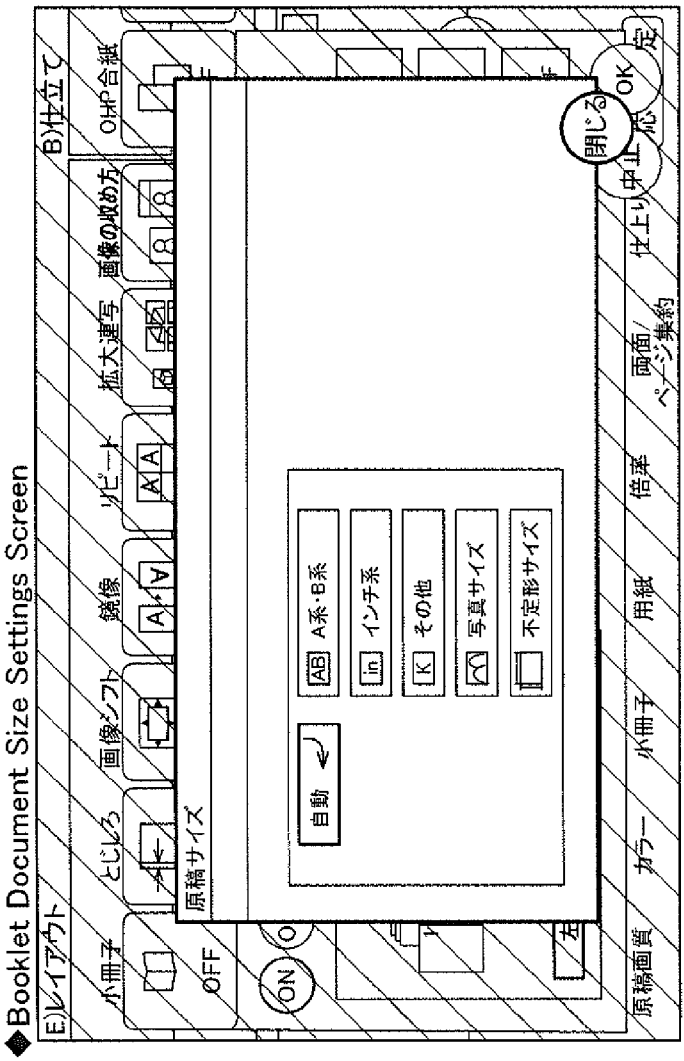

After that, when the user leaves the booklet paper setting screen 3-2 without setting change, return to the booklet settings screen 2-2, then go to a booklet document size settings screen 3-3 illustrated in FIG. 7D, a second image of the booklet document size settings screen 3-3, having a high image quality, is created and displayed as a replacement of a low-quality screen image. The second image is then stored on the cache 103a.

Meanwhile, a new record is added as the cached screen record No. 6 as indicated in a cached screen information table 28 in FIG. 7D; this record describes "Booklet Document Size Settings Screen" in the "Screen" column, "Not Changed" in the "Settings Changed/Not Changed" column, and "Yes" in the "Screen Used" column.

Figures 8, 8A:
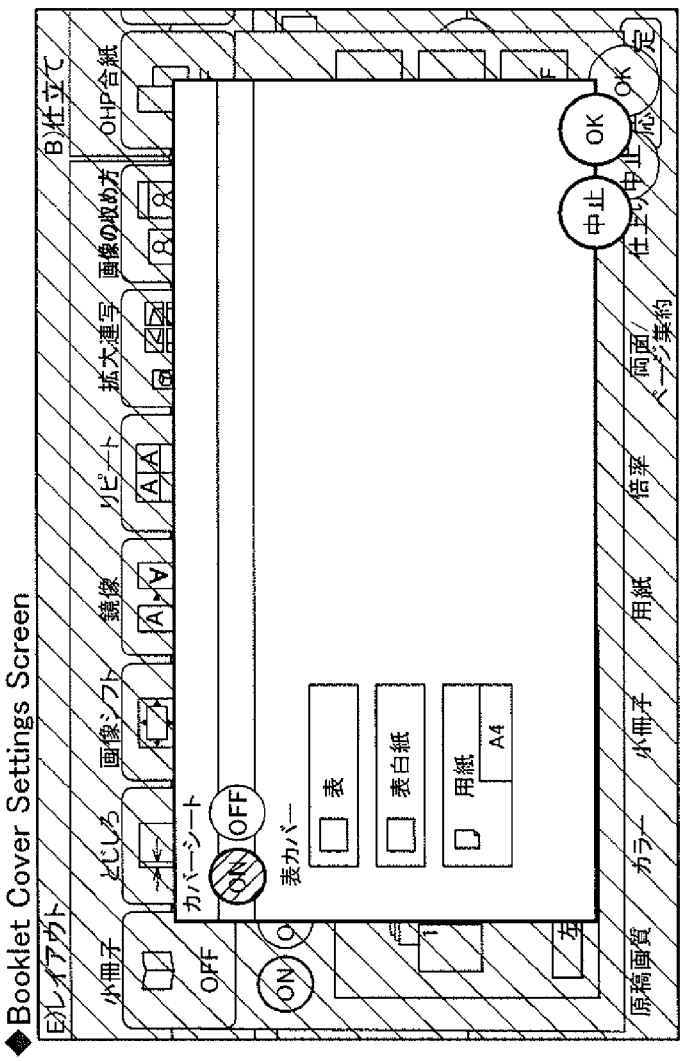

After that, when the user leaves the booklet document size setting screen 3-3 without setting change, return to the booklet settings screen 2-2, then go to a booklet cover settings screen 3-4 illustrated in FIG. 8A, a second image of the booklet cover settings screen 3-4, having a high image quality, is created and displayed as a replacement of a low-quality screen image.

Meanwhile, the cached screen records Nos. 5 and 6, which relate to a "Booklet Paper Settings Screen" and a "Booklet Size Settings Screen", respectively, are updated as indicated in a cached screen information table 29 in FIG. 8A; i.e., the descriptions in their "Screen Used" columns are both changed from "Yes" to "No". That is because the booklet paper settings screen 3-2 and the booklet size settings screen 3-3 are not screens used to reach the booklet cover settings screen 3-4 that is currently displayed or to reach the screen on which settings were changed.

Assuming that the cache 103a is capable of storing up to six screen images, for example, the cache 103a cannot store the second image of the booklet cover settings screen 3-4 since it has already stored as many as six second images.

As a solution to this problem, in this embodiment, a second image of a screen that is not a screen used to reach the screen currently displayed neither a screen used to reach the screen on which settings were changed is erased first. Specifically, as indicated in the cached screen information table 29 illustrated in FIG. 8A, the cached screen records No. 5 and 6 describe "Not Changed" in their "Setting Changed/Not Changed" columns and "No" in their "Screen Used" columns. The second image of either a "Booklet Paper Settings Screen" or a "Booklet Size Settings Screen" is thus erased from the cache 103a. Meanwhile, the corresponding record is removed from the cached screen information table 29.

In this embodiment, the second image of the "Booklet Paper Settings Screen" whose record has a cached screen record number smaller than the other screen is erased first. A second image of the booklet cover settings screen 3-4 is then stored on the cache 103a. Meanwhile, as indicated in a cached screen information table 30, the cached screen record No. 6, which relates to a "Booklet Document Size Settings Screen", is renumbered as the cached screen record No. 5, and a new record, which related to a "Booklet Cover Settings Screen", is added as the cached screen record No. 6.

Figure 8C:
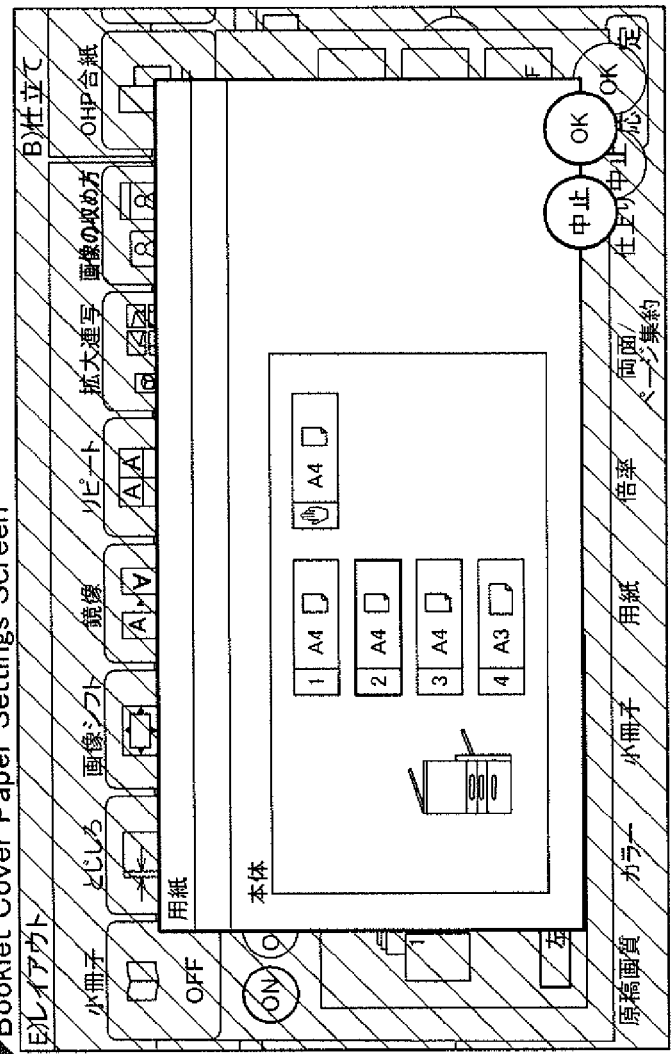

After that, when the user leaves the booklet cover settings screen 3-4 indicated in FIG. 8A and goes to a booklet cover paper settings screen 4-1 indicated in FIG. 8C, the cache 103a cannot store a second image of the booklet cover paper settings screen 4-1 again since it has already stored as many as six second images, which is the upper limit.

Specifically, as indicated in a cached screen information table 31 illustrated in FIG. 8C, the cached screen record No. 5 describes "Not Changed" in the "Setting Changed/Not Changed" column and "No" in the "Screen Used" column. The second image of either a "Booklet Size Settings Screen" is thus erased from the cache 103a. Meanwhile, the corresponding record is removed from the cached screen information table 31. A second image of the booklet cover paper settings screen 4-1 is then stored on the cache 103a. Meanwhile, as indicated in a cached screen information table 32 illustrated in FIG. 8D, the cached screen record No. 6, which relates to a "Booklet Cover Settings Screen", is renumbered as the cached screen record No. 5, and a new record, which related to a "Booklet Cover Paper Settings Screen", is added as the cached screen record No. 6.

As described above, in this embodiment, when the cache 103a has already stored as many screen images as the upper limit, the cache screen information table is searched for a screen that is not the screen on which settings were changed and neither a screen used to reach the screen currently displayed or a screen used to reach the screen on which settings were changed. The screen image of the screen is erased first, and a second image of the screen currently displayed is stored. In other words, second images less likely to be used later for setting review or change, i.e., a second image of a screen on which settings were not changed and a second image of a screen used to reach the screen on which settings were not changed are erased first. This embodiment can thus reduce accidents of automatically erasing a second image more likely to be used later.

Figure 9:
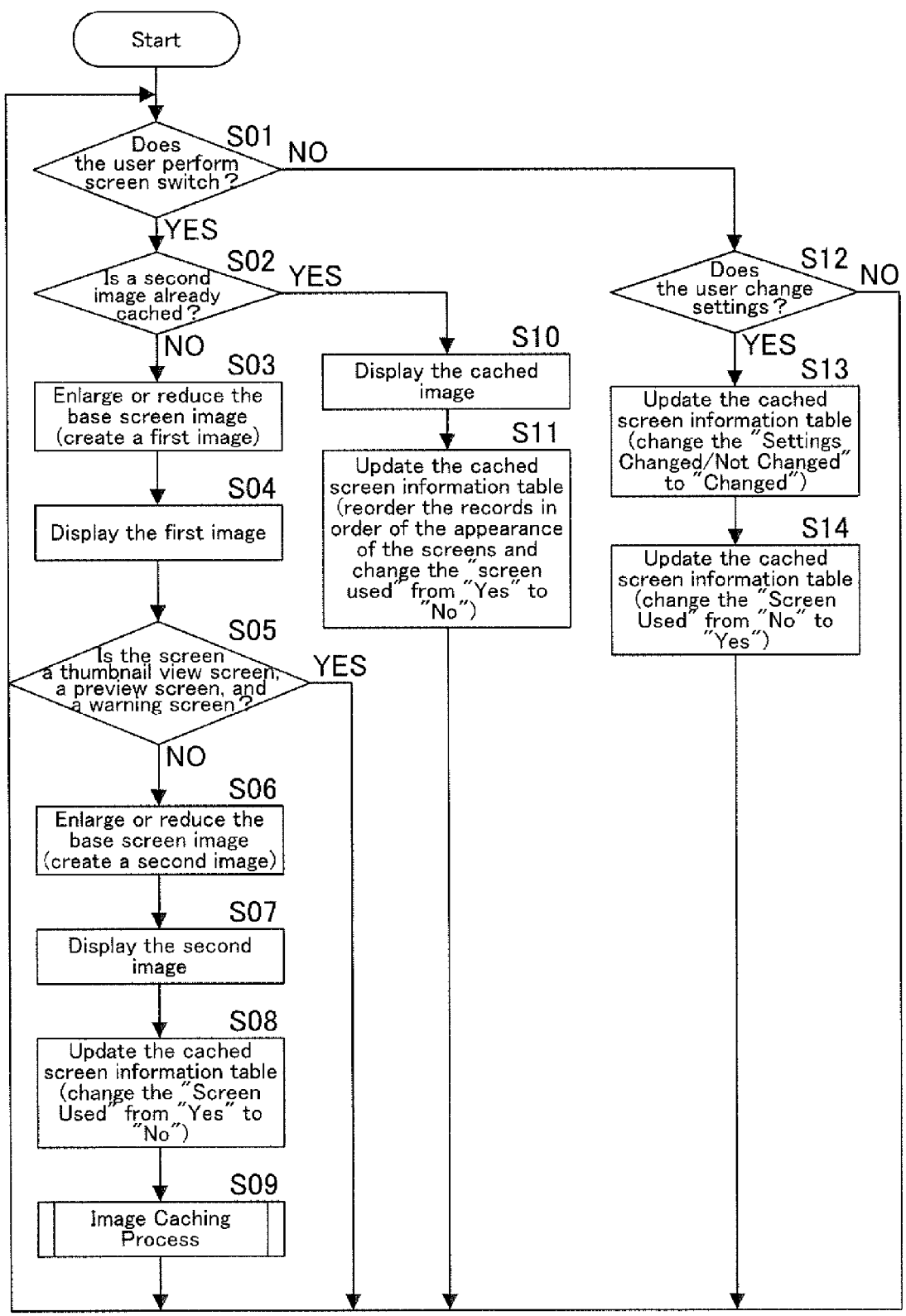
FIG. 9 is a flowchart representing the operation to be performed by the image processing apparatus upon screen switch.

FIG. 9 is a flowchart representing the operation to be performed by the MFP 1 upon screen switch. This operation is performed by the CPU 101 of the MFP 1 in accordance with an operation program stored on a recording medium such as the ROM 22.

In Step S01, it is judged whether or not the user performs screen switch. If the user performs screen switch (YES in Step S01), it is judged in Step S02 whether or not a second image of the target screen is stored on the cache 103a. If it is not stored thereon (NO in Step S02), the routine proceeds to Step S03, in which a first image is created by enlarging or reducing a base screen image to the display resolution of the display 134 while sacrificing image quality for speed.

In Step S04, the first image is displayed on the display 134. In Step S05, with reference to the table in FIG. 3, it is judged which screen the screen is, a screen deserving or not deserving for a second image to be created and stored. In other words, it is judged whether or not the screen is any of the following screens: a thumbnail view screen including thumbnail images, a preview screen including a preview image, and a warning screen.

If it is any of a thumbnail view screen, a preview screen, and a warning screen (YES in Step S05), the routine returns to Step S01 without creating a second image.

If it is none of a thumbnail view screen, a preview screen, and a warning screen (NO in Step S05), the routine proceeds to Step S06, in which a second image, having a high image quality, is created by enlarging or reducing the base screen image to the display resolution of the display 134 while sacrificing speed for image quality. In Step S07, the second image is displayed on the display 134 as a replacement of the first image.

In Step S08, the cached screen information table is searched for a record that does not relate to "a screen used to reach the screen currently displayed or a screen used to reach the screen on which settings were changed", and the description in the "Screen Used" column is changed from "Yes" to "No". An image caching process for storing the second image on the cache 103a is then performed in Step S09. The image caching process will be later described in details.

Back to Step S02, if a second image of the target screen is stored on the cache 103a (YES in Step S02), the second image (cached image) is displayed on the display 134 in Step S10. The cached screen information table is then updated in Step S11. Specifically, the cashed screen records are reordered in order of the appearance of the screens on the display 134. Furthermore, the table is searched for a record that does not relate to "a screen used to reach the screen currently displayed or a screen used to reach the screen on which settings were changed", and the description in the "Screen Used" column is changed from "Yes" to "No". After the cached screen information table is thus updated, the routine returns to Step S01.

In Step S01, if the user does not perform screen switch (No in Step S01), it is then judged in Step S12 whether or not the user changes settings. If the user does not change settings (NO in Step S12), the routine returns to Step S01. If the user changes settings (YES in Step S12), the description in the "Settings Changed/Not Changed" column is changed to "Changed" in Step S13. After the cached screen information table is thus updated, the routine proceeds to Step S14.

In Step S14, the table is searched for a record that does not relate to a screen used to reach the screen on which settings were changed, and the description in the "Screen Used" column is changed from "No" to "Yes". As for the other records, the description "Yes" in the column is not subjected to change. After the cached screen information table is thus updated, the routine returns to Step S01.

Figure 10:
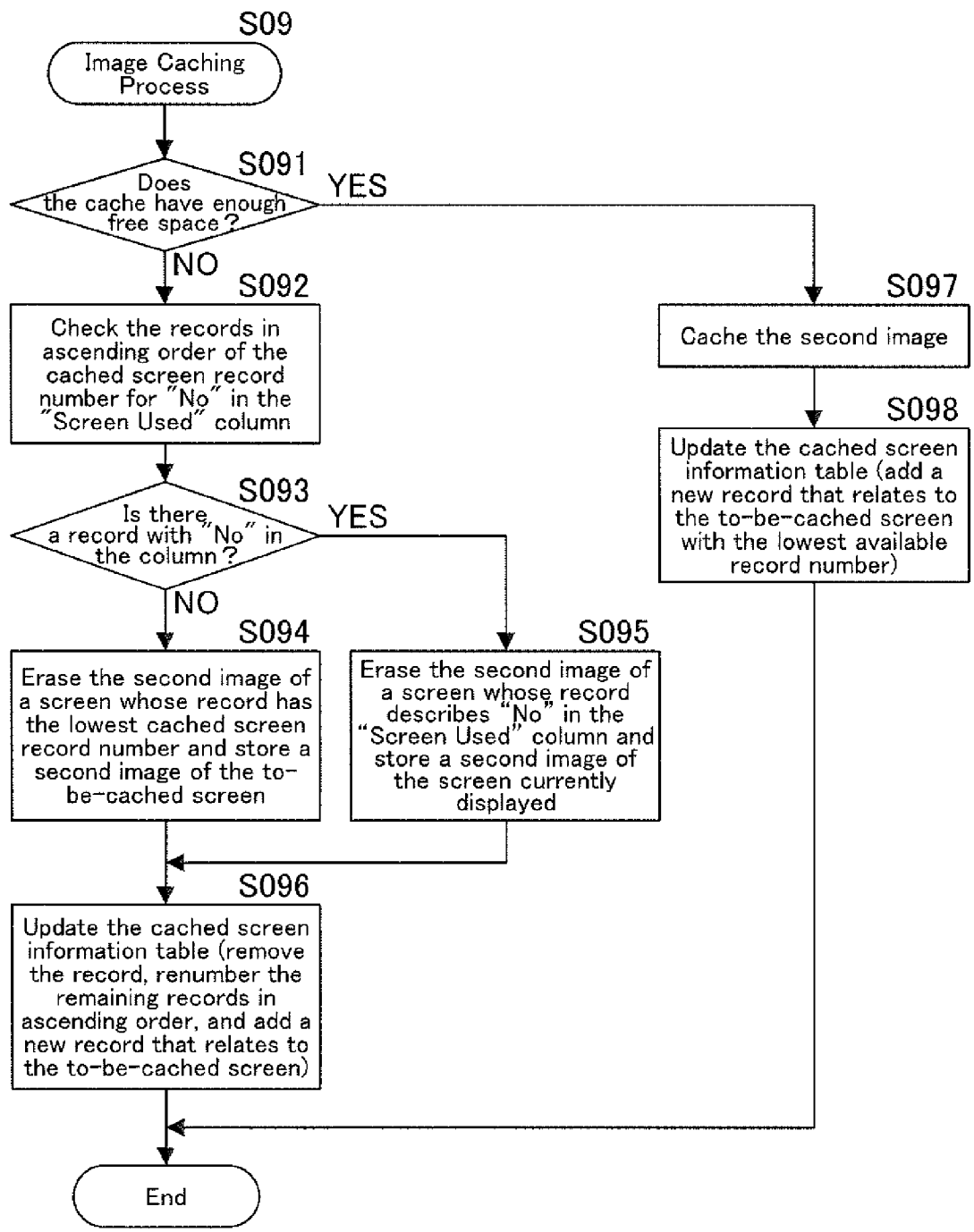
FIG. 10 is a flowchart representing a subroutine of the FIG. 9 flowchart, the image caching process in Step S09.

FIG. 10 is a flowchart representing a subroutine of the FIG. 9 flowchart, which is the image caching process in Step S09.

In Step S091, it is judged whether or not the cache 103*a* has enough free space. If the cache 103*a* does not have enough free space (NO in Step S091), the routine proceeds to Step S092, in which records in the cached screen information table are checked in ascending order of the cached screen record number for "No" in the "Screen Used" columns.

In Step S093, it is then judged whether or not there is a cached screen record that describes "No" in the "Screen Used" column. If there is no such record (NO in Step S093), the routine proceeds to Step S094, in which the second image of a screen whose record has the lowest cached screen record number i.e. the second image of a screen least recently used to reach the to-be-cached screen, is erased and a second image of the to-be-cached screen is stored. The routine then proceeds to Step S096. If there is a cached screen record that describes "No" in the "Screen Used" column (YES in Step S093), the routine proceeds to Step S095, in which the second image of a screen whose record describes "No" in the "Screen Used" column is erased and a second image of the screen currently displayed is stored. The routine then proceeds to Step S096. Here, if there are multiple cached screen records that describe "No" in their "Screen Used" columns, the second image of a screen whose record has the lowest cached screen record number is erased first.

In Step S096, the cached screen information table is updated. Specifically, the record is removed, the remaining records are renumbered in ascending order, and a new record that relates to the to-be-cached screen is added with the highest cached screen record number. After the cached screen information table is thus updated, the subroutine terminates. The routine then returns to Step S01 of FIG. 9.

Back to Step S091, if the cache 103*a* has enough free space (YES in Step S091), the second image of the to-be-cached screen is stored on the cache 103*a* in Step S097. The cached screen information table is then updated in Step S098. Specifically, a new record is added to the cached screen information table with the lowest available record number. After the cached screen information table is thus updated, the subroutine terminates. The routine then returns to Step S01 of FIG. 9.

While one embodiment of the present invention has been described in details herein it should be understood that the present invention is not limited to the foregoing embodiment.

For example, in this embodiment, while a first image of a screen, sacrificing image quality for speed, is displayed on the display 134, a second image of the screen currently displayed, sacrificing speed for image quality, is created. Alternatively, another configuration may be used such that a second image of a possible next screen to be displayed upon screen switch is created while a first image of a screen is displayed, and when the user goes to the possible next screen, the second image of the possible next screen, which is already created, is displayed. This configuration allows a high-quality screen image to be quickly displayed upon screen switch, eliminating the need of a first image being created.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A display device comprising:
a display that displays a screen;

a base screen image storage that stores a base screen image of a size, the size being adjusted to a reference resolution;

a resolution judgment portion that judges whether or not a display resolution of the display is equal to the reference resolution;

an image creator that creates a first image by enlarging or reducing the base screen image to the display resolution of the display while sacrificing image quality for speed and that creates a second image with a higher image quality than that of the first image by enlarging or reducing the base screen image to the display resolution of the display while sacrificing speed for image quality, the base screen image being stored on the base screen image storage, if the resolution judgment portion judges that the display resolution of the display is not equal to the reference resolution;

a second image storage that stores the second image created by the image creator;

a display processor that causes the display to display the first or second image as follows if the resolution judgment portion judges that the display resolution of the display is not equal to the reference resolution: display the first image before the image creator creates the second image, the first image being created by the image creator; display the second image as a replacement of the first image after the image creator creates the second image; and display the second image, if any, upon screen switch, the second image being stored on the second image storage; and a screen judgment portion that judges which screen the screen displayed on the display is, a screen deserving or not deserving for a second image to be stored on the second image storage, with reference to reference information for judgment determining screens deserving and not deserving for second images to be stored on the second image storage, wherein, only if the screen judgment portion judges that it is a screen deserving for a second image to be stored, the image creator creates the second image and the second image storage stores the second image.

2. The display device according to claim 1, wherein:

any one or more of the following screens are defined in the reference information for judgment as screens not deserving for second images to be stored: a warning screen, a screen including a thumbnail image, and a screen including a preview image; and as long as the screen displayed on the display is none of any one or more of the warning screen, the screen including a thumbnail image, and the screen including a preview image, the screen judgment portion judges that it is a screen deserving for a second image to be stored.

3. The display device according to claim 1, wherein:

upon start-up of the display device, the resolution judgment portion obtains the display resolution of the display; and the resolution judgment portion judges whether or not the obtained display resolution is equal to the reference resolution by comparing the obtained display resolution to the reference resolution.

4. The display device according to claim 1, wherein the base screen image, the first image, and the second image each include any one or more of the following images: a button image, an icon image, a background image, a thumbnail image, and a preview image.

5. The display device according to claim 1, wherein the second image created by the image creator is of a possible next screen to be displayed upon screen switch.

6. The display device according to claim 1, wherein, in connection with each second image, the following information is registered on the second image storage as a screen record: type of screen, whether or not settings were changed on the screen, and whether or not the screen is used to reach the screen currently displayed or whether or not the screen is used to reach the screen on which settings were changed.

7. The display device according to claim 1, wherein, when the second image storage does not have free space enough for another second image being created, the second images are erased first from the second image storage, the second images being of a screen on which default settings were not changed and of a screen used to reach the screen on which default settings were not changed.

8. A screen display method for a display device comprising:

a display that displays a screen; and a base screen image storage that stores a base screen image of a size, the size being adjusted to a reference resolution, the screen display method comprising:

judging whether or not a display resolution of the display is equal to the reference resolution;

creating a first image by enlarging or reducing the base screen image to the display resolution of the display while sacrificing image quality for speed and creating a second image with a higher image quality than that of the first image by enlarging or reducing the base screen image to the display resolution of the display while sacrificing speed for image quality, the base screen image being stored on the base screen image storage, if it is judged that the display resolution of the display is not equal to the reference resolution;

storing the created second image on a second image storage;

causing the display to display the first or second image as follows if it is judged that the display resolution of the display is not equal to the reference resolution: display the created first image before the second image is created; display the second image as a replacement of the first image after the second image is created; and display the second image, if any, upon screen switch, the second image being stored on the second image storage; and judging whether the screen displayed on the display is, a screen deserving or not deserving for a second image to be stored on the second image storage, with reference to reference information for judgment determining screens deserving and not deserving for second images to be stored on the second image storage, wherein, only if it is judged that it is a screen deserving for a second image to be stored, the second image is created and stored on the second image storage.

9. A non-transitory computer-readable recording medium storing a screen display program to be run by a computer of a display device, the display device comprising:

a display that displays a screen; and a base screen image storage that stores a base screen image of a size, the size being adjusted to a reference resolution, the screen display program comprising:

judging whether or not a display resolution of the display is equal to the reference resolution;

creating a first image by enlarging or reducing the base screen image to the display resolution of the display while sacrificing image quality for speed and creating a second image with a higher image quality than that of the first image by enlarging or reducing the base screen image to the display resolution of the display while sacrificing speed for image quality, the base screen image being stored on the base screen image storage, if it is judged that the display resolution of the display is not equal to the reference resolution;

storing the created second image on a second image storage;

causing the display to display the first or second image as follows if it is judged that the display resolution of the display is not equal to the reference resolution: display the created first image before the second image is created; display the second image as a replacement of the first image after the second image is created; and display the second image, if any, upon screen switch, the second image being stored on the second image storage; and judging which screen displayed on the display is, a screen deserving or not deserving for a second image to be stored on the second image storage, with reference to reference information for judgment determining screens deserving and not deserving for second images to be stored on the second image storage, wherein, only if it is judged that it is a screen deserving for a second image to be stored, the second image is created and stored on the second image storage.

10. The non-transitory computer-readable recording medium according to claim 9, storing the screen display program to be run by the computer, wherein:

any one or more of the following screens are defined in the reference information for judgment as screens not deserving for second images to be stored: a warning screen, a screen including a thumbnail image, and a screen including a preview image; and as long as the screen displayed on the display is none of the any one or more of the warning screen, the screen including a thumbnail image, and the screen including a preview image, it is judged that it is a screen deserving for a second image to be stored.

11. The non-transitory computer-readable recording medium according to claim 9, storing the screen display program to be run by the computer, wherein:

upon start-up of the display device, the display resolution of the display is obtained; and it is judged whether or not the obtained display resolution is equal to the reference resolution by comparing the obtained display resolution to the reference resolution.

12. The non-transitory computer-readable recording medium according to claim 9, storing the screen display program to be run by the computer, wherein the base screen image, the first image, and the second image each include any one or more of the following images: a button image, an icon image, a background image, a thumbnail image, and a preview image.

13. The non-transitory computer-readable recording medium according to claim 9, storing the screen display program to be run by the computer, wherein the second image created is of a possible next screen to be displayed upon screen switch.

14. The non-transitory computer-readable recording medium according to claim 9, storing the screen display program to be run by the computer, wherein, in connection with each second image, the following information is registered on the second image storage as a screen record: type of screen, whether or not settings were changed on the screen, and whether or not the screen is used to reach the screen currently displayed or whether or not the screen is used to reach the screen on which settings were changed.

15. The non-transitory computer-readable recording medium according to claim 9, storing the screen display program to be run by the computer, wherein, when the second image storage does not have free space enough for another second image being created, the second images are erased first from the second image storage, the second images being of a screen on which default settings were not changed and of a screen used to reach the screen on which default settings were not changed.

16. An image processing apparatus comprising the display device according to claim 1.

\* \* \* \* \*